(No Model.)
D. W. PALMER.
SADDLE TREE AND CHECK HOOK.
No. 360,241. Patented Mar. 29, 1887.
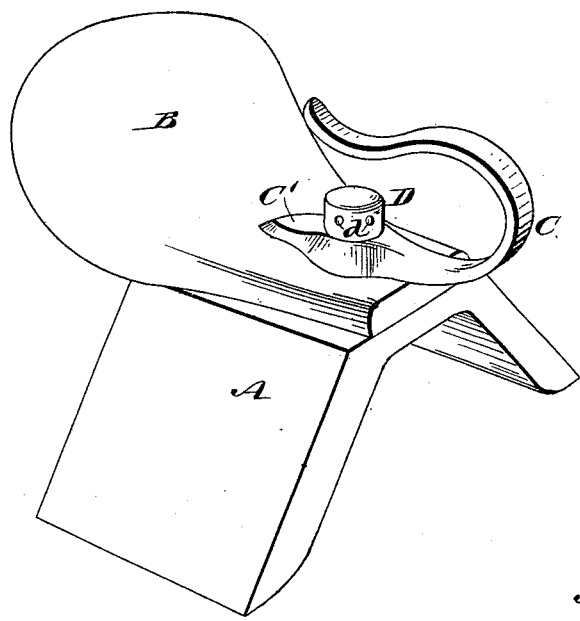
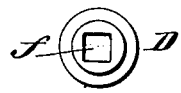
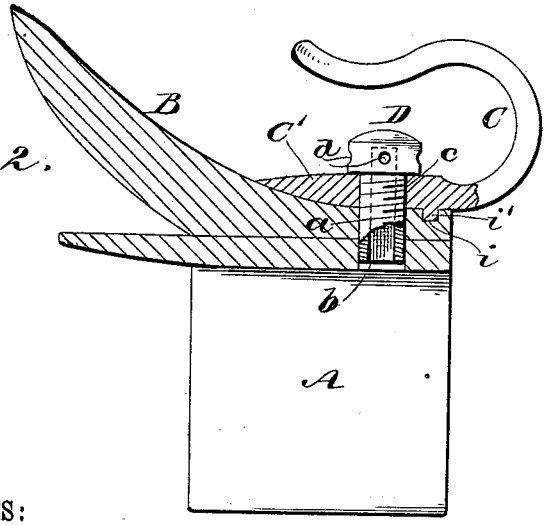
WITNESSES:
INVENTOR:
D. W. Palmer
BY Munn & Co.
ATTORNEYS.

UNITED STATES PATENT OFFICE.

DENNIS WILSON PALMER, OF PLYMOUTH, ASSIGNOR TO G. W. BERRY, OF ROCKLAND, MAINE.

SADDLE-TREE AND CHECK-HOOK.

SPECIFICATION forming part of Letters Patent No. 360,241, dated March 29, 1887.

Application filed December 14, 1886. Serial No. 221,524. (No model.)

*To all whom it may concern:*

Be it known that I, DENNIS WILSON PALMER, of Plymouth, in the county of Penobscot and State of Maine, have invented a new and Improved Saddle-Tree and Check-Hook, of which the following is a full, clear, and exact description.

Reference is to be had to the accompanying drawings, forming a part of this specification, in which similar letters of reference indicate corresponding parts in all the figures.

Figure 1 is a perspective view of a saddle-tree and check-hook constructed and united in accordance with my invention. Fig. 2 is a sectional elevation of the same; and Fig. 3 is an end view of the screw for uniting the hook, saddle, and tree.

The invention will first be described in connection with the drawings, and then pointed out in the claims.

The saddle-tree A may be of any approved construction. The saddle B is fitted upon the upper side of the tree, and is formed with an aperture, a, to coincide with the screw-threaded aperture b in the center of the tree A. The check-hook C is formed with a flattened and curved plate, C', to fit upon the upper surface of the saddle B, and is formed with an aperture, c, to coincide with the apertures a and b, so that the hook and saddle may both be secured to the tree by a single screw, D, inserted from the top, so that there will be no danger of the screw working out and no danger of the screw coming in contact with the back of the horse.

The head of the screw D may be made square or formed with the orifices d for turning it beneath the upper part of the hook, which hangs over the screw, and the lower end of the screw is formed with a square socket, f, extending up into the screw, so that in case the screw should break a square instrument may be inserted in said socket from the upper side of the tree A for turning out the remaining portion of the screw, so that a new one can be turned in, and by so doing have the repairing done without injury to the saddle; and to prevent the check-hook from turning upon the saddle and pin D, I form a socket, i, in the saddle and a projection, i', at the bottom of the hook, to enter said socket, as clearly shown in Fig. 2.

Constructed in this manner there is no danger of the screw injuring the horse's back, and the head of the screw standing in the mouth of the hook serves also as a stop to prevent the check of the bridle from falling or working out of the hook.

Having thus fully described my invention, what I claim as new, and desire to secure by Letters Patent, is—

1. The combination, with the tree A and the saddle B, having a socket, i, in its upper surface, of a hook, C, having a projection, i', on the under surface, and the bolt D, provided with the head d, substantially as herein shown and described.

2. The combination, with the tree A, saddle B, and hook C, of the screw D, inserted from the top and formed at its lower end with the socket f, substantially as and for the purposes set forth.

DENNIS WILSON PALMER.

Witnesses:
WINNIE F. HASKELL,
LOUIS O. HASKELL.

Correction in Letters Patent No. 360,241.

It is hereby certified that Letters Patent No. 360,241, granted March 29, 1887, upon the application of Dennis Wilson Palmer, of Plymouth, Maine, for an improvement in "Saddle-Tree and Check-Hooks," was erroneously issued to G. W. Berry, as assignee of the entire interest; that the said Letters Patent should have been issued to said *Dennis Wilson Palmer and G. W. Berry* jointly, said Berry being assignee of one-half interest only in said invention; and that the said Letters Patent should be read with this correction therein that the same may conform to the record of the case in the Patent Office.

Signed, countersigned, and sealed this 26th day of April, A. D. 1887.

[SEAL.]

D. L. HAWKINS,
*Acting Secretary of the Interior.*

Countersigned:
    BENTON J. HALL,
        *Commissioner of Patents.*